(12) United States Patent  (10) Patent No.: US 8,999,094 B2
Pettersson et al.  (45) Date of Patent: Apr. 7, 2015

(54) METHOD OF CONTINUOUS MANUFACTURE OF A COMPOSITE HOLLOW BOARD MATERIAL, AND MACHINE AND COMPUTER PROGRAM

(75) Inventors: Dan Pettersson, Ljungby (SE); Bengt Andreasson, Torslanda (SE)

(73) Assignee: IKEA Supply AG (CH)

( * ) Notice: Subject to any disclaimer, the term of this patent is extended or adjusted under 35 U.S.C. 154(b) by 128 days.

(21) Appl. No.: 13/879,382

(22) PCT Filed: Oct. 13, 2010

(86) PCT No.: PCT/EP2010/065324
§ 371 (c)(1),
(2), (4) Date: Aug. 15, 2013

(87) PCT Pub. No.: WO2012/048738
PCT Pub. Date: Apr. 19, 2012

(65) Prior Publication Data
US 2013/0333839 A1  Dec. 19, 2013

(51) Int. Cl.
*B32B 3/12* (2006.01)
*B32B 7/12* (2006.01)
(Continued)

(52) U.S. Cl.
CPC .............. *B32B 7/12* (2013.01); *B29D 99/0089* (2013.01); *B31D 3/0238* (2013.01); *B31D 3/0284* (2013.10); *E04C 2/36* (2013.01)

(58) Field of Classification Search
CPC ........................................................ B32B 3/12
USPC ......... 156/196, 201, 205, 206, 254, 264, 517, 156/519; 493/395, 461; 428/116, 119, 582, 428/593, 603
See application file for complete search history.

(56) References Cited

U.S. PATENT DOCUMENTS 3,264,153 A * 8/1966 Rodman et al. ................ 156/79

5,116,688 A  5/1992 Minamida et al.
2004/0177590 A1  9/2004 Nudo et al.

FOREIGN PATENT DOCUMENTS

DE     43 19 792   12/1994
DE  10 2006 056353  12/2007
(Continued)

OTHER PUBLICATIONS

International Search Report and Written Opinion mailed Jul. 7, 2011 for PCT/EP2010/065324.
(Continued)

*Primary Examiner* — Jeff Aftergut
*Assistant Examiner* — Jaeyun Lee
(74) *Attorney, Agent, or Firm* — Merchant & Gould P.C.

(57) ABSTRACT

A method of continuous manufacture of a composite hollow board material comprising a first surface and a second surface, and between the first and second surfaces a plurality of distance members is disclosed. The method comprises providing material for the first surface from a first reel via a first guide roller towards an output lane; providing material for the second surface from a second reel via a second guide roller towards the output lane; and providing material for the distance members from a third reel towards the output lane such that the distance members comprises strips arranged, at any cross section perpendicular to the first and second surfaces and the direction of the output lane, perpendicular to the first and second surfaces and continuous along the output lane. The providing of material for the distance members comprises guiding at least some of the strips in a meandering pattern, and applying an adhesive to contact the strips on opposite edges thereof such that adhesion to the material of the first and second surfaces is enabled. The first and second guide rollers press the material of the first and second surfaces to the opposite edges of the strips, respectively, such that the material of the first and second surfaces are adhered to the strips. A machine for continuous manufacture of the composite hollow board material, and a computer program for controlling a machine for continuous manufacture of the composite hollow board material are also disclosed.

15 Claims, 5 Drawing Sheets

(51) Int. Cl.
  *B29D 99/00* (2010.01)
  *B31D 3/02* (2006.01)
  *E04C 2/36* (2006.01)

(56) References Cited

FOREIGN PATENT DOCUMENTS

| EP | 0 034 453 | 8/1981 |
| JP | S5745047 | 3/1982 |
| JP | S63166517 | 7/1988 |
| JP | H05193028 | 8/1993 |
| JP | H6316010 | 11/1994 |
| JP | H07300685 | 11/1995 |
| WO | WO 2010/069993 | 6/2010 |
| WO | WO 2010/069994 | 6/2010 |

OTHER PUBLICATIONS

International Preliminary Report on Patentability mailed Jan. 22, 2013 for PCT/EP2010/065324.

* cited by examiner

US 8,999,094 B2

METHOD OF CONTINUOUS MANUFACTURE OF A COMPOSITE HOLLOW BOARD MATERIAL, AND MACHINE AND COMPUTER PROGRAM

This application is a National Stage Application of PCT/EP2010/065324, filed 13 Oct. 2010 and which application is incorporated herein by reference. To the extent appropriate, a claim of priority is made to the above disclosed application.

TECHNICAL FIELD

The present invention generally relates to a method of continuous manufacture of a composite hollow board material, a machine for continuous manufacture of a composite hollow board material, and a computer program for controlling a machine for continuous manufacture of a composite hollow board material, the computer program comprises computer executable instructions arranged to cause control of the machine to perform the method.

BACKGROUND

Composite hollow board materials, which in this disclosure means a material including more than one sheet material with intermediate distance material. Such composite hollow board materials, compared to solid board materials or wood, provides a lightweight and relatively strong material. Examples of such materials are disclosed in DE 4319792 and WO 2010/069994. However, provision of composite hollow board materials traditionally require a complex manufacturing process, many times requiring manual acts by labour and issues regarding material feed and assembly. It is therefore a desire to provide efficient manufacture of composite hollow board materials.

SUMMARY

An object of the invention is to at least alleviate the above stated problem. The present invention is based on the understanding that by continuous manufacture of a composite hollow board material as disclosed herein, the advantageous features of the material can be combined with lowered cost. As a feature enabled by the approach, the inventors also found that quality control is facilitated by tuning the continuous manufacture process properly.

According to a first aspect, there is provided a method of continuous manufacture of a composite hollow board material comprising a first surface and a second surface, and between the first and second surfaces a plurality of distance members. The method comprises providing material for the first surface from a first reel via a first guide roller towards an output lane; providing material for the second surface from a second reel via a second guide roller towards the output lane; and providing material for the distance members from a third reel towards the output lane such that the distance members comprises strips arranged, at any cross section perpendicular to the first and second surfaces and the direction of the output lane, perpendicular to the first and second surfaces and continuous along the output lane. The providing of material for the distance members comprises guiding at least some of the strips in a meandering pattern, and applying an adhesive to contact the strips on opposite edges thereof such that adhesion to the material of the first and second surfaces is enabled. The first and second guide rollers press the material of the first and second surfaces to the opposite edges of the strips, respectively, such that the material of the first and second surfaces are adhered to the strips.

An advantage of the provided material is that the perpendicularly arranged distance material provides for a lightweight and relatively strong composite hollow board material. The continuous manufacture process enables efficient manufacture.

The method may further comprise providing material for further distance members. The providing of material for further distance members may be performed from a fourth reel towards the output lane. The provision of further distance members may comprise joining a plurality of strips by adhesive to form a lath, and providing the lath towards the output lane; applying an adhesive to the lath on opposite sides thereof such that adhesion to the material of the first and second surfaces is enabled; and guiding the lath such that the lath is arranged continuous along the output lane between the first and second surfaces, wherein the first and second guide rollers press the material of the first and second surfaces to the opposite sides of the lath, respectively, such that the material of the first and second surfaces are adhered to the lath. The providing of material for the further distance members may further comprise slitting material provided from the fourth reel such that the strips are formed.

An advantage of providing material for further distance members can be to provide a solid part to the board material, e.g. for integrating fastening means or to form a solid edge.

The providing of material for the distance members may further comprise slitting material provided from the third reel such that the strips are formed. An advantage of forming the strips during the continuous manufacturing process is that material feed to the process can be facilitated, and possibly more versatile.

The guiding at least some of the strips in a meandering pattern, for each strip to be formed into the meandering pattern, may comprise running the strip between a pair of lateral guide members; and alternatingly swinging the pair of lateral guide members in a plane parallel to the plane of the first and second surfaces around a direction of the output lane. The alternatingly swinging of the pair of lateral guide members may comprise synchronously driving all the pairs of lateral guide members such that all the meandering strips are in phase considering a direction of the output lane. The alternatingly swinging of the pair of lateral guide members may comprise synchronously driving every other of the pairs of lateral guide members, and synchronously driving the other pairs of lateral guide members, such that the meandering strips are alternatingly in-phase and in counter-phase considering a direction of the output lane. The alternatingly swinging of the pair of lateral guide members may comprise synchronously driving a first set of the pairs of lateral guide members, and synchronously driving a second set of pairs of lateral guide members, such that the meandering strips are alternatingly in-phase and in quadrature-phase considering a direction of the output lane. Versatility of pattern design of distance material, controllability and enablement of process tuning, and enabling of a high speed process are advantages of these features.

The method may further comprise controlling speed of the reels and roller guides based on the longer distance of the meandering strips. An advantage of this is enablement of tuning of the process to achieve the proper pattern of the distance material.

According to a second aspect, there is provided a machine for continuous manufacture of a composite hollow board material. The machine comprises a first reel arrangement from which material for the first surface is provided via a first guide roller towards an output lane; a second reel arrangement from which material for the second surface is provided via a second guide roller towards the output lane; a third reel arrangement from which material for the distance members is provided towards the output lane such that the distance members comprises strips arranged, at any cross section perpendicular to the first and second surfaces and the direction of the output lane, perpendicular to the first and second surfaces and continuous along the output lane, a guide mechanism arranged to guide the strips in a pattern between first and second surfaces to control position for insertion of respective strip in a transversal direction to the output lane such that the pattern is achieved as the first and second surface material and the respective strips run in between the guide rolls; and an adhesive application mechanism for applying an adhesive to contact the strips on opposite edges thereof such that adhesion to the material of the first and second surfaces is enabled. The first and second guide rollers press the material of the first and second surfaces to the opposite sides of the strips, respectively, such that the material of the first and second surfaces are adhered to the strips as the first and second surface material and the respective strips run in between the guide rolls.

The machine may further comprise a lath feeding mechanism for providing material for further distance members in form of one or more laths such that the lath is arranged continuous along the output lane between the first and second surfaces to be adhered between the first and second surfaces by the first and second guide rollers press the material of the first and second surfaces to the opposite sides of the lath. The machine may further comprising a lath preparation mechanism comprising a fourth reel arranged to provide material for the further distance members towards the output lane, wherein the material for each lath being formed as a plurality of strips; a guide mechanism for assembling the strips to run in parallel towards the output lane; an adhesive application mechanism arranged to apply adhesive enabling the parallel strips to be adhered; and a press mechanism arranged to press the parallel strips together such that the parallel strips, after application of the adhesive, are adhered to each other such that the lath is achieved. The lath preparation mechanism may further comprise a cutting mechanism for cutting a sheet material provided from the fourth reel into a plurality of strips. The machine may further comprise a pair of adhesive applicators for applying an adhesive to contact the lath on opposite sides thereof such that adhesion to the material of the first and second surfaces, respectively, is enabled.

According to a third aspect, there is provided a computer program for controlling a machine for continuous manufacture of a composite hollow board material. The computer program comprises computer executable instructions arranged to cause control of the machine to perform the method according to the first aspect.

Advantages of features of the second and third aspects are similar to those demonstrated for the first aspect.

Other objectives, features and advantages of the present invention will appear from the following detailed disclosure, from the attached dependent claims as well as from the drawings. Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings.

DETAILED DESCRIPTION OF PREFERRED EMBODIMENTS

Figure 1:
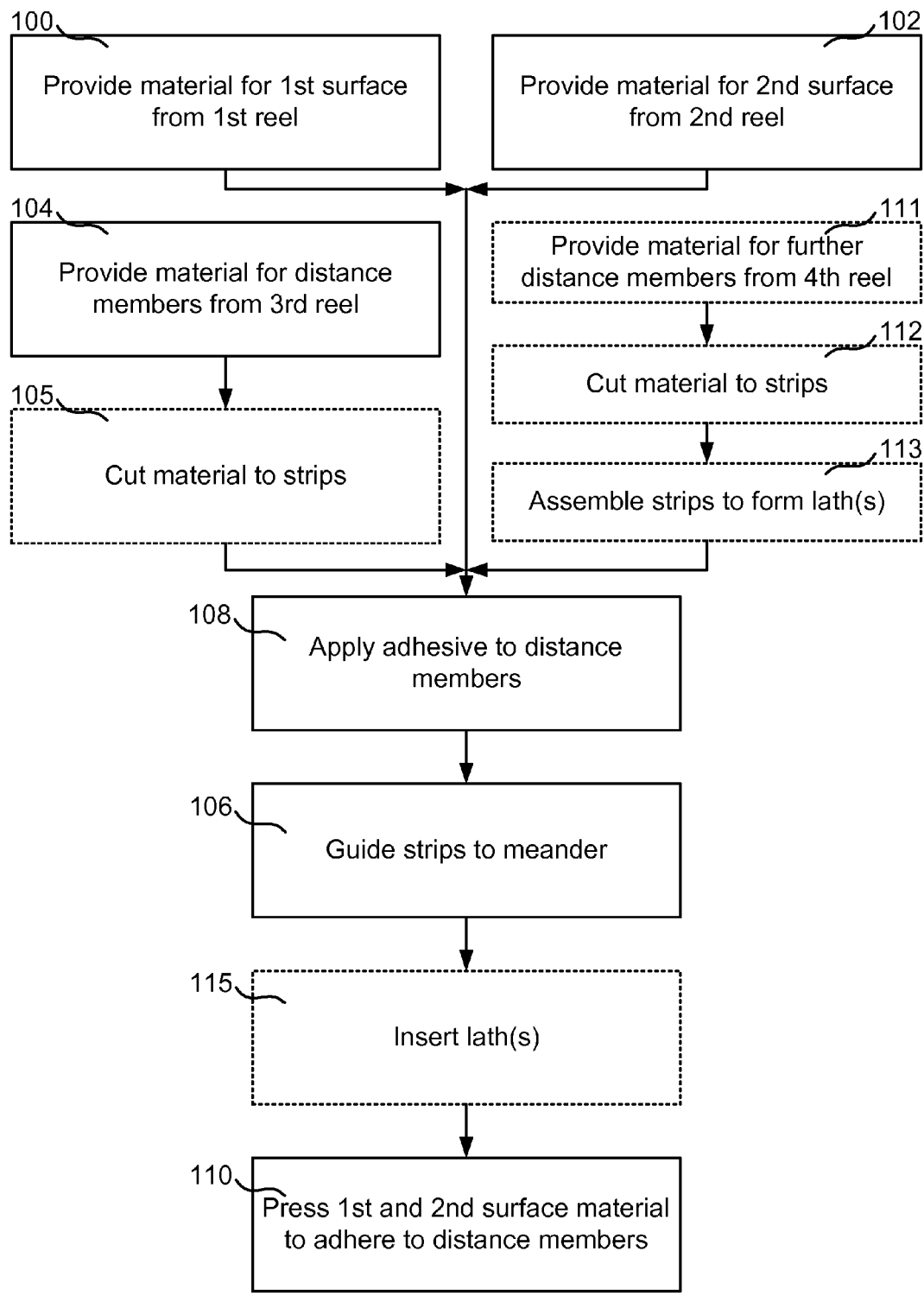
FIG. 1 is a flow chart schematically illustrating a method of continuous manufacture of a composite hollow board material.
Figure 2:
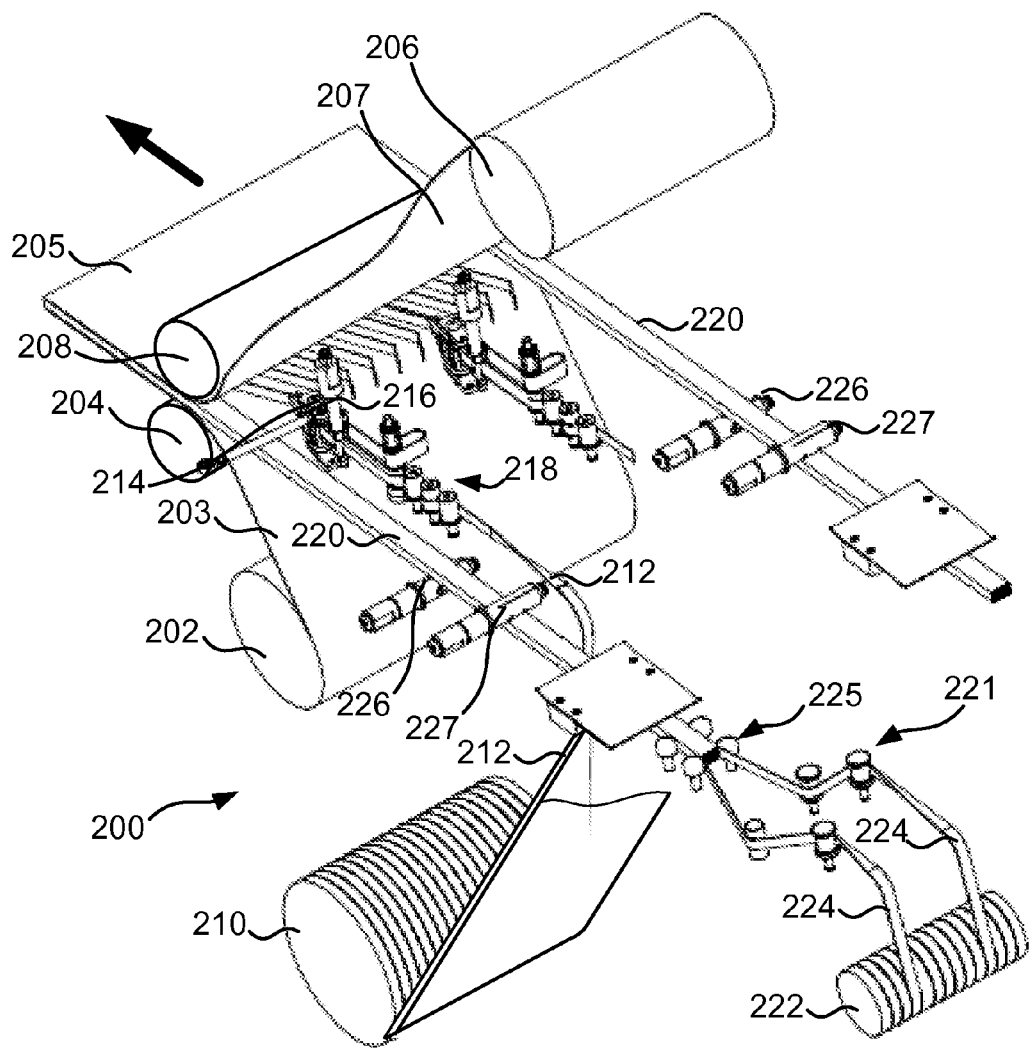
FIG. 2 illustrates an overview of a machine for implementing the method.
Figure 5:
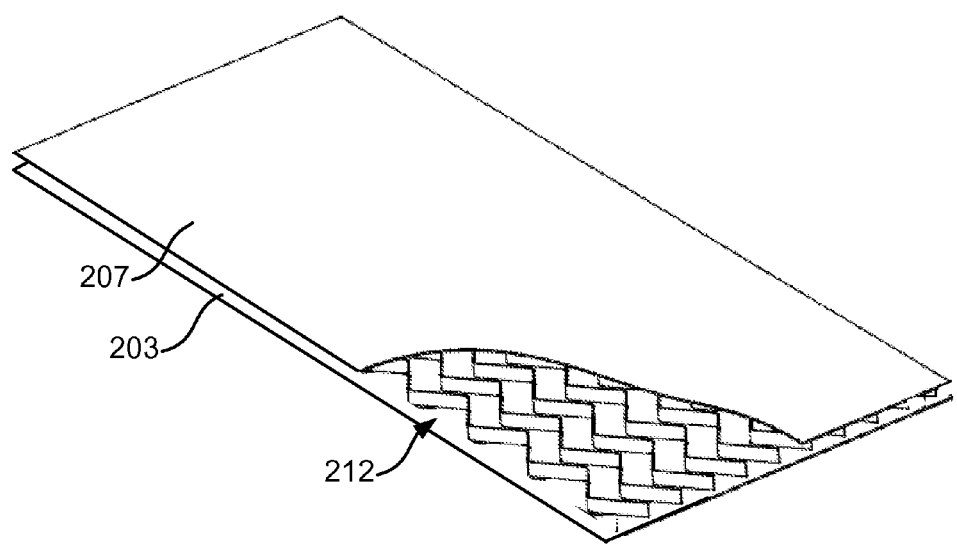
FIG. 5 illustrates a piece of a composite hollow board material provided by an embodiment of the method.
Figure 11:
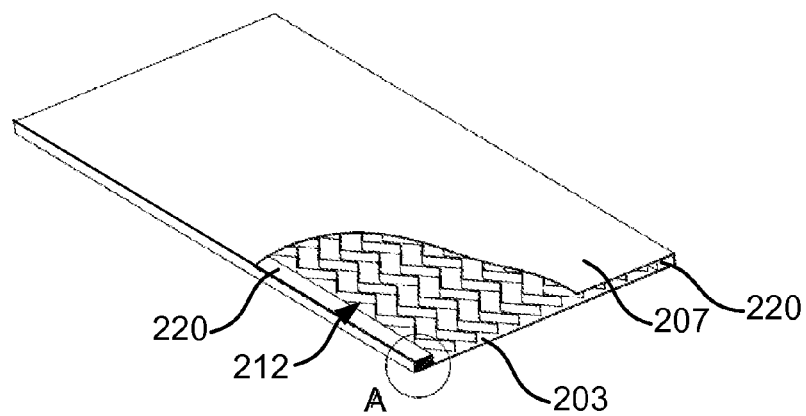
FIGS. 11 and 12 illustrate, respectively, a piece of a composite hollow board material provided by an embodiment of the method.
Figure 12:
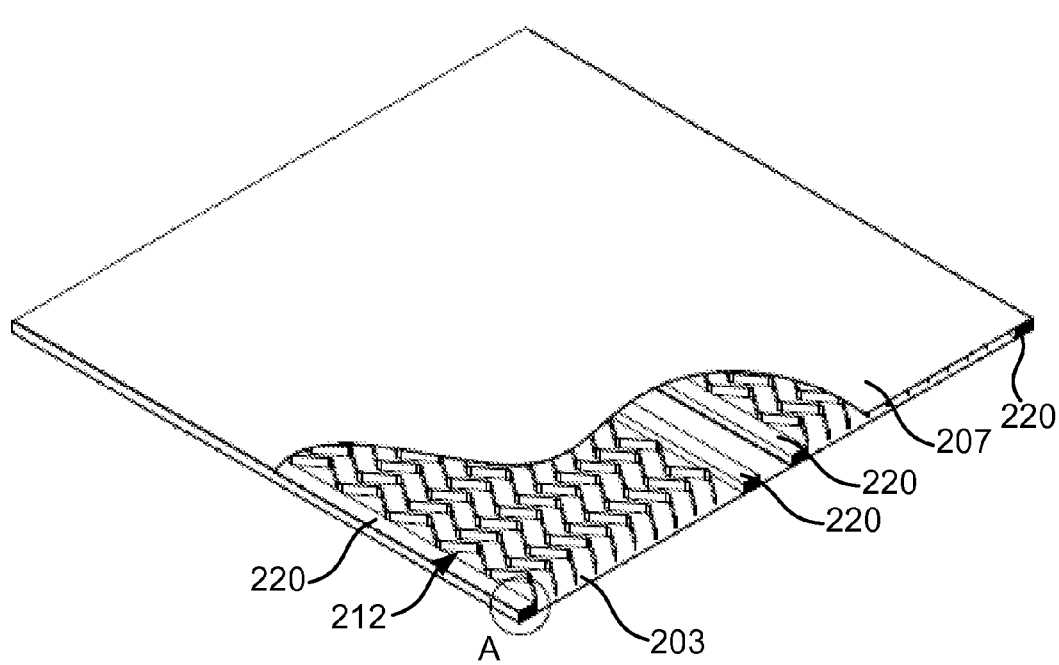

FIG. 1 is a flow chart illustrating a method of continuous manufacture of a composite hollow board material. The composite hollow board material comprises a first surface and a second surface, and between the first and second surfaces a plurality of distance members, for example as can be seen in FIGS. 5, 11 and 12. The method comprises providing material 100 for the first surface from a first reel via a first guide roller towards an output lane, e.g. as illustrated in FIG. 2. Similarly, the method comprises providing material 102 for the second surface from a second reel via a second guide roller towards the output lane, e.g. as also illustrated in FIG. 2. Further, the method comprises providing material 104 for the distance members from a third reel towards the output lane such that the distance members comprises strips arranged, at any cross section perpendicular to the first and second surfaces and the direction of the output lane, perpendicular to the first and second surfaces and continuous along the output lane. Optionally, the material for the distance members is cut 105 into strips, as depicted for one strip in FIG. 2, i.e. slitting material provided from the third reel such that the strips are formed, or the strips are pre-prepared at the provision 104 of the distance material.

Upon providing the material for the distance members, at least some of the strips are guided 106 in a meandering pattern, and an adhesive is applied 108 to contact the strips on opposite edges thereof such that adhesion to the material of the first and second surfaces is enabled. The application 108 of the adhesive can be made on the edges of the strip or strips, or be made on the respective surface materials where the strips are to be arranged. The first and second guide rollers press 110 the material of the first and second surfaces to the opposite edges of the strips, respectively, such that the material of the first and second surfaces are adhered to the strips.

Figure 10:
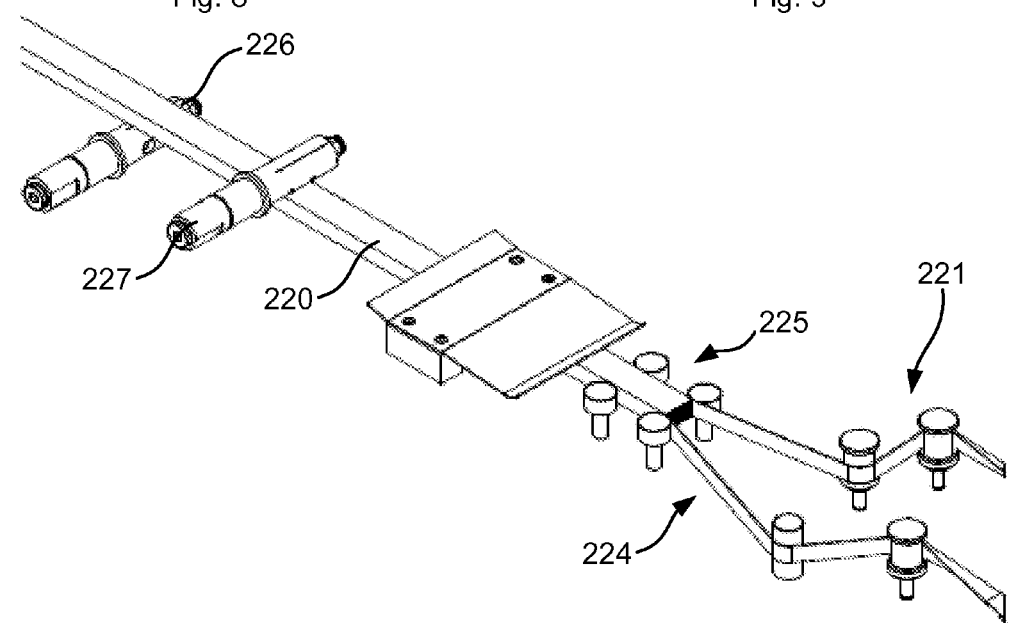
FIG. 10 illustrates a part of the machine where further distance material is formed.

The method can further comprise providing material 111 for further distance members from a fourth reel towards the output lane, joining 113 a plurality of strips by adhesive to form a lath, and providing the lath towards the output lane, for example as illustrated in FIG. 10. The one or more laths can be applied to achieve a composite hollow board material as illustrated in any of FIGS. 11 to 13. Optionally, the material for the further distance members is achieved by slitting 112 material provided from the fourth reel such that the strips are formed, for example as illustrated in FIG. 1. Alternatively, the strips are pre-prepared.

The method can comprise applying an adhesive to contact the lath on opposite sides thereof such that adhesion to the material of the first and second surfaces is enabled. The application of the adhesive can be made on the sides of the lath, or be made on the respective surface materials where the lath is to be arranged. Then the method comprises guiding 115 the lath such that the lath is arranged continuous along the output lane between the first and second surfaces, wherein the first and second guide rollers press 110 the material of the first and second surfaces to the opposite sides of the lath, respectively, such that the material of the first and second surfaces are adhered to the lath.

Figure 6:
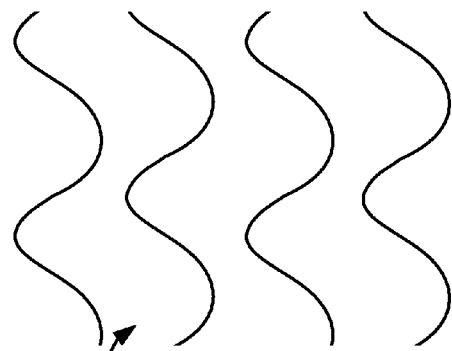
FIGS. 6 to 9 illustrate examples of provided patterns of provision of the distance material.
Figure 7:
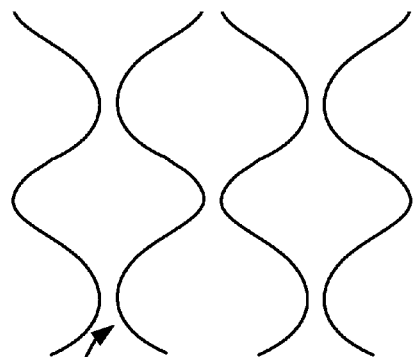
Figure 8:
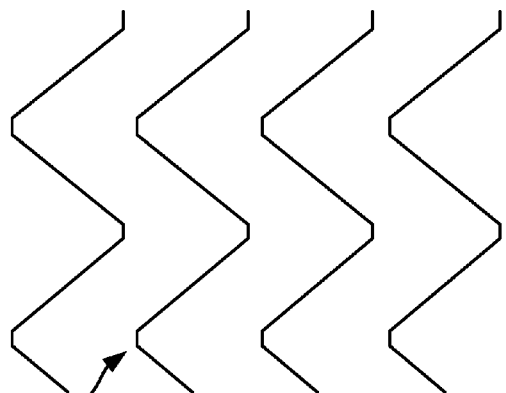
Figure 9:
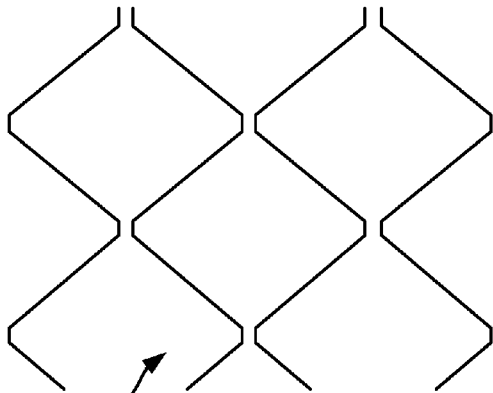

The guiding of the strips in a meandering pattern, for each strip to be formed into the meandering pattern, can be achieved by running the strip between a pair of lateral guide members, and alternatingly swinging the pair of lateral guide members in a plane parallel to the plane of the first and second surfaces around a direction of the output lane. The alternatingly swinging of the pair of lateral guide members can comprise synchronously driving all the pairs of lateral guide members such that all the meandering strips are in phase considering a direction of the output lane, for example as illustrated in FIG. 8. The alternatingly swinging of the pair of lateral guide members can comprise synchronously driving every other of the pairs of lateral guide members, and synchronously driving the other pairs of lateral guide members, such that the meandering strips are alternatingly in-phase and in counter-phase considering a direction of the output lane, for example as illustrated in FIGS. 7 and 9. The alternatingly swinging of the pair of lateral guide members comprises synchronously driving a first set of the pairs of lateral guide members, and synchronously driving a second set of pairs of lateral guide members, such that the meandering strips are alternatingly in-phase and in quadrature-phase considering a direction of the output lane, for example as illustrated in FIG. 6.

The method can further comprise controlling speed of the reels and roller guides based on the longer distance of the meandering strips compared to the material of the first and second surfaces. The controlling of the speed can be based on the assigned pattern for the distance members.

The material can for example be paper or board material, e.g. the material disclosed in WO 2010/069993 which has excellent properties for being wound on a reel.

Figure 3:
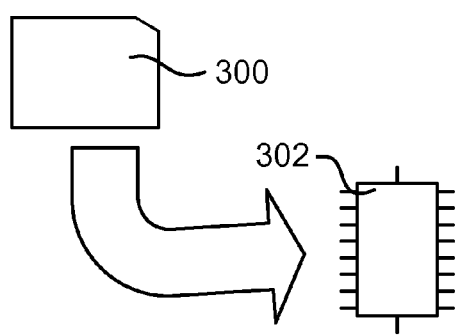
FIG. 3 schematically illustrates a computer readable medium and a processor for implementing control of a machine for implementing the method.

The methods according to the present invention is suitable for implementation with aid of processing means, such as computers and/or processors, especially for the case where control of reels, rolls and adhesive applicators is provided by the processing means. Therefore, there is provided computer programs, comprising instructions arranged to cause the processing means, processor, or computer to perform the steps of controlling any of the methods according to any of the embodiments described with reference to FIG. 1. The computer programs preferably comprises program code which is stored on a computer readable medium 300, as illustrated in FIG. 3, which can be loaded and executed by a processing means, processor, or computer 302 to cause it to perform the methods, respectively, according to embodiments of the present invention, preferably as any of the embodiments described with reference to FIG. 1. The computer 302 and computer program product 300 can be arranged to execute the program code sequentially where actions of the any of the methods are performed stepwise. The processing means, processor, or computer 302 is preferably what normally is referred to as an embedded system. Thus, the depicted computer readable medium 300 and computer 302 in FIG. 3 should be construed to be for illustrative purposes only to provide understanding of the principle, and not to be construed as any direct illustration of the elements.

FIG. 2 schematically illustrates a machine 200 for implementing an embodiment of the method demonstrated above. The machine 200 comprises a first reel arrangement 202 from which material 203 for the first surface is provided via a first guide roller 204 towards an output lane 205, from which the produced composite hollow board material is provided in the direction of the bold arrow. The machine 200 correspondingly comprises a second reel arrangement 206 from which material 207 for the second surface is provided via a second guide roller 208 towards the output lane 205.

The machine 200 further comprises a third reel arrangement 210 from which material 211 for the distance members is provided towards the output lane 205 such that the distance members comprises strips 212 arranged, at any cross section perpendicular to the first and second surfaces and the direction of the output lane, perpendicular to the first and second surfaces and continuous along the output lane 205.

An adhesive is applied by an adhesive application mechanism 216. The adhesive can be applied to the edges of the strips 212, or to parts of the first and second surfaces where the strips 212 are to be adhered, i.e. to contact the strips 212 on opposite edges thereof such that adhesion to the material of the first and second surfaces is enabled. In FIG. 2, the embodiment where adhesive is applied to the edges of the strips 212 is illustrated.

A guide mechanism 214 provides the material for the distance members in a desired pattern by guiding the strip 212 for example in a meandering pattern. The guide mechanism 214 is arranged to, as the first and second surface material 203, 207 and the respective strips run in between the guide rolls 204, 208, to control position for insertion of respective strip in a transversal direction to the output lane 205. The first and second guide rollers 204, 208 press the material of the first and second surfaces 203, 207 to the opposite edges of the strips 212, respectively, such that the material of the first and second surfaces 203, 207 are adhered to the strips 212.

Figure 4:
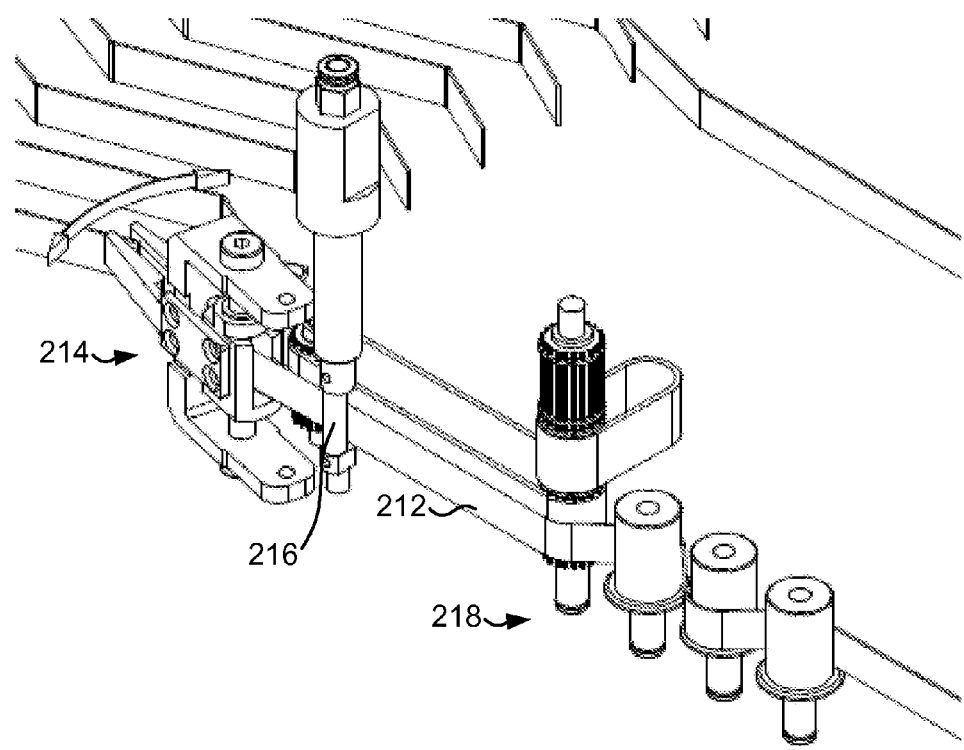
FIG. 4 illustrates a part of the machine where distance material is provided.

FIG. 4 illustrates an embodiment of the guide mechanism 214, the adhesive application mechanism 216, and a feed mechanism 218 in greater detail. The feed mechanism 218 ensures that the proper amount of strip 212 is provided to the guide mechanism, and is preferably controlled as demonstrated above with reference to the method and computer program. The feed mechanism 218 can include a plurality of rollers which are arranged to feed the strip 212 by the proper amount by rotating with a controlled speed. Consider for example a pattern as illustrated in any of FIG. 8 or 9. The portion angled relative to the general direction of the output lane 205 requires a higher feed speed of the strip 212 than the feed speed of the first and second surface material 203, 207, while the portion essentially parallel to the output lane 205 requires a feed speed of about the same as the feed speed of the first and second surface material 203, 207. Alternatively, the feed speed is provided by the first and second surface material 203, 207 pulling the strip at an instant adhesion, and the feed mechanism 218 is arranged to provide a proper resistance to keep the strip in position such that any slack is taken up before the feed mechanism 218.

FIG. 5 illustrates an embodiment of a composite hollow board that is achievable by the process demonstrated above.

Returning to FIG. 2, the machine can further be arranged to provide further distance members formed as a lath 220 between the first and second surface material 203, 207. Material is provided from a fourth reel 222 towards the output lane 205. The material comprises a plurality of strips, which can be pre-prepared, or cut during the process from a material sheet. The plurality of strips 224 are joined by adhesive to form the lath 220, and the lath 220 is fed towards the output lane. Alternatively, the lath 220 can be a pre-prepared lath, e.g. made of wood, metal, polymer, and optionally include mounting details or the like. The one or more laths can be applied to achieve a composite hollow board material for example as illustrated in any of FIGS. 11 to 13.

FIG. 10 illustrates preparation parts of the machine for the lath 220 in greater detail. The preparation parts can include a cutting mechanism (not shown) for cutting a sheet material into a plurality of strips. The preparation part comprises a guide mechanism 221 for assembling the strips to run in parallel towards the output lane 205. An adhesive application mechanism applies adhesive such that the parallel strips can be adhered. The preparation parts also comprises a press mechanism 225 such that the parallel strips, after application of the adhesive, are pressed together and thus adhered to each other such that the lath is achieved. After the preparation parts, the machine can include adhesive applicators 226, 227 for applying an adhesive to contact the lath on opposite sides thereof such that adhesion to the material of the first and second surfaces 203, 207, respectively, is enabled. The application of the adhesive can be made on the sides of the lath 220 as illustrated in FIG. 10, or be made on the respective surface materials where the lath is to be arranged. The lath 220 can thus be guided such that the lath is arranged continuous along the output lane 205 between the first and second surfaces 203, 207, wherein the first and second guide rollers 204, 208 press the material of the first and second surfaces 203, 207 to the opposite sides of the lath 220, respectively, such that the material of the first and second surfaces 203, 207 are adhered to the lath, simultaneously with the adhesion of the strips 212 to the first and second surfaces 203, 207, as illustrated in FIG. 2. Here, it should be noted that further means for pressing the composite hollow board material, e.g. if an adhesive is used that needs further activation time, can be provided along the output lane 205 although not illustrated in FIG. 2. Also, further operations can be enabled along the output lane 205 after the pressing operation. For example, folding of any protruding part or parts of the first and second surfaces 203, 207 can be made to form a side edge or side edges of the composite hollow board material, cutting, grinding and/or sanding can be made, as well as application of a separate side strip or rail, and finally preferably cutting up and packing achieved composite hollow boards.

FIGS. 11 and 12 illustrate embodiments of a composite hollow board that is achievable by the process demonstrated above.

A particular advantage of the above demonstrated approach, in all its embodiments, is that the process can be run continuously, which provides for an efficient and thus less costly manufacturing process. Quality control is also facilitated, since when the process is tuned, quality difference between the achieved products will be very low and/or insignificant. Simultaneously, the traditional advantages intended to be achieved from composite hollow board materials, i.e. lightweight and relatively strong, are achieved.

FIG. 5 illustrates an embodiment of a composite hollow board material manufactured according to the approach demonstrated above. A part of one of the surface materials is removed in the illustration to depict the distance material between the surface materials.

Figure 13:
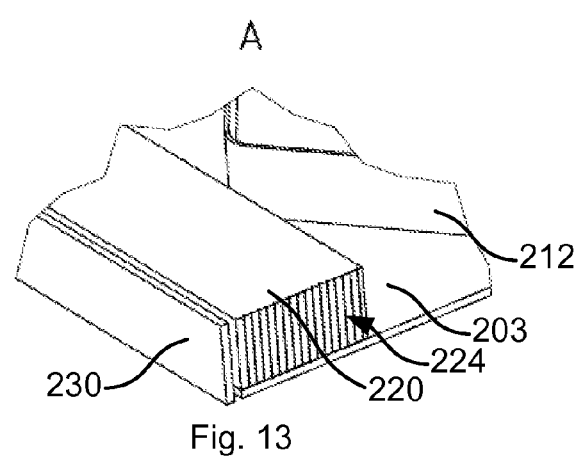
FIG. 13 illustrates detail A of FIGS. 11 and 12, respectively, of the further distance material provided by an embodiment of the method.

FIGS. 11 and 12 illustrate embodiments of a composite hollow board material manufactured according to the approach demonstrated above, where laths are included. A part of one of the surface materials is removed in the illustration to depict the distance material between the surface materials. FIG. 13 illustrates a detail A as marked in FIGS. 11 and 12, respectively. FIG. 13 also illustrates an additional edge element 230, which can be applied separately, or integrated with the process demonstrated above, i.e. provided from a further reel and applied, e.g. with adhesive or welding, to the edge of the board material.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of continuous manufacture of a composite hollow board material comprising a first surface and a second surface, and between the first and second surfaces a plurality of distance members, the method comprising
    providing material for the first surface from a first reel via a first guide roller towards an output lane;
    providing material for the second surface from a second reel via a second guide roller towards the output lane;
    providing material for the distance members from a third reel towards the output lane such that the distance members comprises strips arranged, at any cross section perpendicular to the first and second surfaces and the direction of the output lane, perpendicular to the first and second surfaces and continuous along the output lane;
    applying an adhesive to contact the strips on opposite edges thereof such that adhesion to the material of the first and second surfaces is enabled; and
    pressing the material of the first and second surfaces to the opposite edges of the strips, respectively, by the first and second guide rollers such that the material of the first and second surfaces are adhered to the strips,
    wherein the providing of material for the distance members comprises, prior the pressing by the first and second guide rollers, guiding at least some of the strips in a meandering pattern relative to the first and second surfaces and meandering around the general direction of the output lane, and in the general directions of the axes of the first and second guide rollers.

2. The method further comprising
    providing material for further distance members from a fourth reel towards the output lane, the provision of further distance members comprising
    joining a plurality of strips by adhesive to form a lath,
    providing the lath towards the output lane;
    applying an adhesive to the lath on opposite sides thereof such that adhesion to the material of the first and second surfaces is enabled; and
    guiding the lath such that the lath is arranged continuous along the output lane between the first and second surfaces, wherein the first and second guide rollers press the material of the first and second surfaces to the opposite sides of the lath, respectively, such that the material of the first and second surfaces are adhered to the lath.

3. The method according to claim 2, wherein the providing of material for the further distance members further comprises slitting material provided from the fourth reel such that the strips are formed.

4. The method according to claim 1, wherein the providing of material for the distance members further comprises slitting material provided from the third reel such that the strips are formed.

5. The method according to claim 1, wherein the guiding at least some of the strips in a meandering pattern, for each strip to be formed into the meandering pattern, comprises
running the strip between a pair of lateral guide members; and
alternatingly swinging the pair of lateral guide members in a plane parallel to the plane of the first and second surfaces around a direction of the output lane.

6. The method according to claim 5, wherein the alternatingly swinging of the pair of lateral guide members comprises synchronously driving all the pairs of lateral guide members such that all the meandering strips are in phase considering a direction of the output lane.

7. The method according to claim 5, wherein the alternatingly swinging of the pair of lateral guide members comprises synchronously driving every other of the pairs of lateral guide members, and synchronously driving the other pairs of lateral guide members, such that the meandering strips are alternatingly in-phase and in counter-phase considering a direction of the output lane.

8. The method according to claim 5, wherein the alternatingly swinging of the pair of lateral guide members comprises synchronously driving a first set of the pairs of lateral guide members, and synchronously driving a second set of pairs of lateral guide members, such that the meandering strips are alternatingly in-phase and in quadrature-phase considering a direction of the output lane.

9. The method according to claim 1, further comprising controlling speed of the reels and roller guides based on the longer distance of the meandering strips.

10. A machine for continuous manufacture of a composite hollow board material and a computer program for controlling the machine for continuous manufacture of the composite hollow board material, the computer program comprising computer executable instruction arranged to cause control of the machine to perform the method according to claim 1.

11. A machine for continuous manufacture of a composite hollow board material, the machine comprising
a first reel arrangement from which material for the first surface is provided via a first guide roller towards an output lane;
a second reel arrangement from which material for the second surface is provided via a second guide roller towards the output lane;
a third reel arrangement from which material for the distance members is provided towards the output lane such that the distance members comprises strips arranged, at any cross section perpendicular to the first and second surfaces and the direction of the output lane, perpendicular to the first and second surfaces and continuous along the output lane,
a guide mechanism arranged to guide the strips in a pattern between first and second surfaces to control position for insertion of respective strip in a transversal direction to the output lane such that the pattern is achieved as the first and second surface material and the respective strips run in between the guide rolls; and
an adhesive application mechanism for applying an adhesive to contact the strips on opposite edges thereof such that adhesion to the material of the first and second surfaces is enabled, and
wherein the first and second guide rollers press the material of the first and second surfaces to the opposite sides of the strips, respectively, such that the material of the first and second surfaces are adhered to the strips as the first and second surface material and the respective strips run in between the guide rolls.

12. The machine according to claim 11, further comprising a lath feeding mechanism for providing material for further distance members in form of one or more laths such that the lath is arranged continuous along the output lane between the first and second surfaces to be adhered between the first and second surfaces by the first and second guide rollers press the material of the first and second surfaces to the opposite sides of the lath.

13. The machine according to claim 12, further comprising a lath preparation mechanism comprising
a fourth reel arranged to provide material for the further distance members towards the output lane, wherein the material for each lath being formed as a plurality of strips;
a guide mechanism for assembling the strips to run in parallel towards the output lane;
an adhesive application mechanism arranged to apply adhesive enabling the parallel strips to be adhered; and
a press mechanism arranged to press the parallel strips together such that the parallel strips, after application of the adhesive, are adhered to each other such that the lath is achieved.

14. The machine according to claim 13, wherein the lath preparation mechanism further comprises a cutting mechanism for cutting a sheet material provided from the fourth reel into a plurality of strips.

15. The machine according to claim 12, further comprising a pair of adhesive applicators for applying an adhesive to contact the lath on opposite sides thereof such that adhesion to the material of the first and second surfaces, respectively, is enabled.

* * * * *